US012136789B2

(12) United States Patent
Fuller, II

(10) Patent No.: US 12,136,789 B2
(45) **Date of Patent: *Nov. 5, 2024**

(54) ELECTRICAL OUTLET WITH SAFETY FEATURE

(71) Applicant: Stephen Saxon Fuller, II, Spring, TX (US)

(72) Inventor: Stephen Saxon Fuller, II, Spring, TX (US)

( * ) Notice: Subject to any disclaimer, the term of this patent is extended or adjusted under 35 U.S.C. 154(b) by 383 days.

This patent is subject to a terminal disclaimer.

(21) Appl. No.: 17/864,102

(22) Filed: Jul. 13, 2022

(65) Prior Publication Data

US 2022/0344878 A1 Oct. 27, 2022

Related U.S. Application Data

(63) Continuation-in-part of application No. 17/234,422, filed on Apr. 19, 2021, now Pat. No. 11,431,137.

(60) Provisional application No. 63/146,337, filed on Feb. 5, 2021, provisional application No. 63/135,564, filed on Jan. 8, 2021.

(51) Int. Cl.
*H01R 13/713* (2006.01)
*H01R 13/44* (2006.01)
*H01R 13/66* (2006.01)

(52) U.S. Cl.
CPC ........... *H01R 13/713* (2013.01); *H01R 13/44* (2013.01); *H01R 13/6691* (2013.01)

(58) Field of Classification Search
None
See application file for complete search history.

(56) References Cited

U.S. PATENT DOCUMENTS 3,665,252 A 5/1972 Rogers, Sr. et al.
4,059,843 A 11/1977 Girismen
4,378,579 A 3/1983 Hudson, Jr.
4,466,040 A 8/1984 Barthel et al.
(Continued)

FOREIGN PATENT DOCUMENTS

WO WO-2019151955 A1 * 8/2019 ......... H01R 13/6675

*Primary Examiner* — Tho D Ta
(74) *Attorney, Agent, or Firm* — Keeling Law, LLC; Kenneth A. Keeling; Mark S. Solomon

(57) ABSTRACT

Embodiments of an electrical outlet of the present invention generally include one or more sockets which include, in addition to positive, negative, and optionally, grounding electrical connections, at least one coupling/communication component, wherein AC electrical current flows through the outlet only when a plug comprising a complementary coupling/communication component is engaged with the socket, whereby the proximity of the coupling/communication component and the complementary coupling/communication component actuates the outlet to provide electrical current therethrough. In one embodiment, in lieu of a complementary coupling/communication component, a wireless transmission device is used to send a signal to the coupling/communication component to actuate the outlet. In other embodiments, an electrical outlet of the present invention includes a mechanism for maintaining engagement between the outlet and a receptacle/plug that provides for safe disengagement when they are inadvertently separated. Embodiments of a method of using embodiments of apparatuses of the present invention are also provided.

26 Claims, 12 Drawing Sheets

(56) References Cited

U.S. PATENT DOCUMENTS

| | | | |
|---|---|---|---|
| 4,616,285 | A | 10/1986 | Sackett |
| 4,867,694 | A | 9/1989 | Short |
| 4,915,639 | A | 4/1990 | Cohn et al. |
| 4,970,349 | A | 11/1990 | Jones |
| 4,995,017 | A | 2/1991 | Sellati et al. |
| 5,029,037 | A | 7/1991 | Bartelink |
| 5,095,182 | A | 3/1992 | Thompson |
| 5,151,841 | A | 9/1992 | Knights |
| 5,267,116 | A | 11/1993 | Avitan |
| 5,708,551 | A | 1/1998 | Bosatelli |
| 5,999,384 | A | 12/1999 | Chen et al. |
| 6,038,115 | A | 3/2000 | Kleemeier et al. |
| 6,049,143 | A | 4/2000 | Simpson et al. |
| 6,111,733 | A | 8/2000 | Neiger et al. |
| 6,183,264 | B1 | 2/2001 | Harsányi |
| 6,252,407 | B1 | 6/2001 | Gershen |
| 6,455,789 | B1 | 9/2002 | Allison |
| 6,495,775 | B2 | 12/2002 | Lawson et al. |
| 6,552,888 | B2 | 4/2003 | Weinberger |
| 6,979,212 | B1 | 12/2005 | Gorman |
| 6,986,674 | B1 | 1/2006 | Gorman |
| 7,400,476 | B1 | 7/2008 | Hull, Jr. |
| 7,525,402 | B2 | 4/2009 | Gao |
| 7,887,349 | B1 | 2/2011 | Macomber |
| 7,932,644 | B2 | 4/2011 | Poyner et al. |
| 7,978,447 | B2 | 7/2011 | Baxter |
| 9,077,105 | B2 | 7/2015 | Kim |
| 9,685,806 | B2 * | 6/2017 | Bencuya ............... H02J 7/0045 |
| 10,194,296 | B2 * | 1/2019 | Tetreault ............. H04L 12/2838 |
| 2020/0194942 | A1 | 6/2020 | Pink et al. |
| 2020/0328586 | A1 * | 10/2020 | Eriksen ................ H02H 1/0061 |

* cited by examiner

ELECTRICAL OUTLET WITH SAFETY FEATURE

CROSS-REFERENCE TO RELATED APPLICATIONS

This application is a continuation-in-part application of U.S. patent application Ser. No. 17/234,422, filed on Apr. 19, 2021, which application claims the benefit of United States Provisional Application No. 63/135,564, filed on Jan. 8, 2021, and 63/146,337, filed on Feb. 5, 2021, which applications are all incorporated herein by reference as if reproduced in full below.

STATEMENT REGARDING FEDERALLY SPONSORED RESEARCH OR DEVELOPMENT

Not Applicable.

FIELD OF THE INVENTION

The present invention generally relates to a device for more safely providing electrical energy to electronic devices. More particularly, embodiments of the present invention are directed to an electrical outlet that comprises a means for requiring coupled engagement between an outlet component and a plug component before electrical energy is supplied via the electrical outlet.

BACKGROUND OF THE INVENTION

Traditional alternating current (AC) power electrical outlets (e.g., 120V and 240V, 480V) are wire-connected to municipal power supplies and/or localized power production systems (e.g., solar panel systems, wind farms, gas-powered backup generators, etc.). Typically, such outlets comprise two orifices through which electrical current flows when an electrical device is connected to the outlet via a plug which comprises two protruding members that are fitted into the orifices. Since electrical energy of such voltages can be hazardous, safety features have been incorporated into electrical outlets. In one aspect, outlets may contain an earthing (grounding) connection, which operates to protect against insulation failure of a connected electrical device. In another aspect, an outlet may comprise a ground fault circuit interrupter (GFCI) (also known as a residual-current device (RCD) or residual-current circuit breaker (RCCB)). Such a device automatically breaks the electrical circuit (and therefore stops the flow of electricity through the outlet) when it detects that the electrical current is not balanced between the supply and return conductors of the circuit.

Many electrical outlet modifications and improvements have been described, such as in U.S. Pat. No. 3,665,252 to Rogers, Sr. et al.; U.S. Pat. No. 4,059,843 to Girismen; U.S. Pat. No. 4,378,579 to Hudson, Jr.; U.S. Pat. No. 4,466,040 to Barthel et al.; U.S. Pat. No. 4,616,285 to Sackett; U.S. Pat. No. 4,867,694 to Short; U.S. Pat. No. 4,915,639 to Cohn et al.; U.S. Pat. No. 4,970,349 to Jones; U.S. Pat. No. 4,995,017 to Sellati et al.; U.S. Pat. No. 5,029,037 to Bartelink; U.S. Pat. No. 5,095,182 to Thompson; U.S. Pat. No. 5,151,841 to Knights; U.S. Pat. Nos. 5,267,116 and 5,426,552 to Avitan; U.S. Pat. No. 5,708,551 to Bosatelli; U.S. Pat. No. 5,999,384 to Chen et al.; U.S. Pat. No. 6,038,115 to Kleemeier et al.; U.S. Pat. No. 6,049,143 to Simpson et al.; U.S. Pat. No. 6,111,733 to Neiger et al.; U.S. Pat. No. 6,183,264 to Harsányi; U.S. Pat. No. 6,252,407 to Gershen; U.S. Pat. No. 6,455,789 to Allison; U.S. Pat. No. 6,495,775 to Lawson et al.; U.S. Pat. No. 6,552,888 to Weinberger; U.S. Pat. No. 6,979,212 to Gorman; U.S. Pat. No. 6,986,674 to Gorman; U.S. Pat. No. 7,400,476 to Hull, Jr.; U.S. Pat. No. 7,525,402 to Gao; U.S. Pat. No. 7,887,349 to Macomber; U.S. Pat. No. 7,932,644 to Poyner et al; U.S. Pat. No. 7,978,447 to Baxter; and U.S. Pat. No. 9,077,105 to Kim, each of which is incorporated herein by reference to the extent not inconsistent herewith.

Importantly, obtaining electrical current through such outlets merely requires contact with the conducting lead within one or both of orifices and a path to ground. Accordingly, if a child, for example, inserts an object into an outlet opening, electrical current can move through the object and through the child, possibly causing serious injury or death. It would therefore be useful to provide an electrical outlet that removes such a risk of electrocution.

BRIEF SUMMARY OF THE INVENTION

Embodiments of an apparatus of the present invention generally include an electrocution prevention electricity provision device comprising a communication member, wherein AC electrical power flows through the device only when an object comprising a complementary communication member is contacted with the device, whereby the proximity of the communication members actuates the device to provide electrical current therethrough. Embodiments of a method of using embodiments of an apparatus of the present invention are also provided.

BRIEF DESCRIPTION OF THE DRAWINGS

For a more complete understanding of the present invention, reference is now made to the accompanying drawings, in which.

DETAILED DESCRIPTION OF EXEMPLARY EMBODIMENTS OF THE INVENTION

Figure 1:
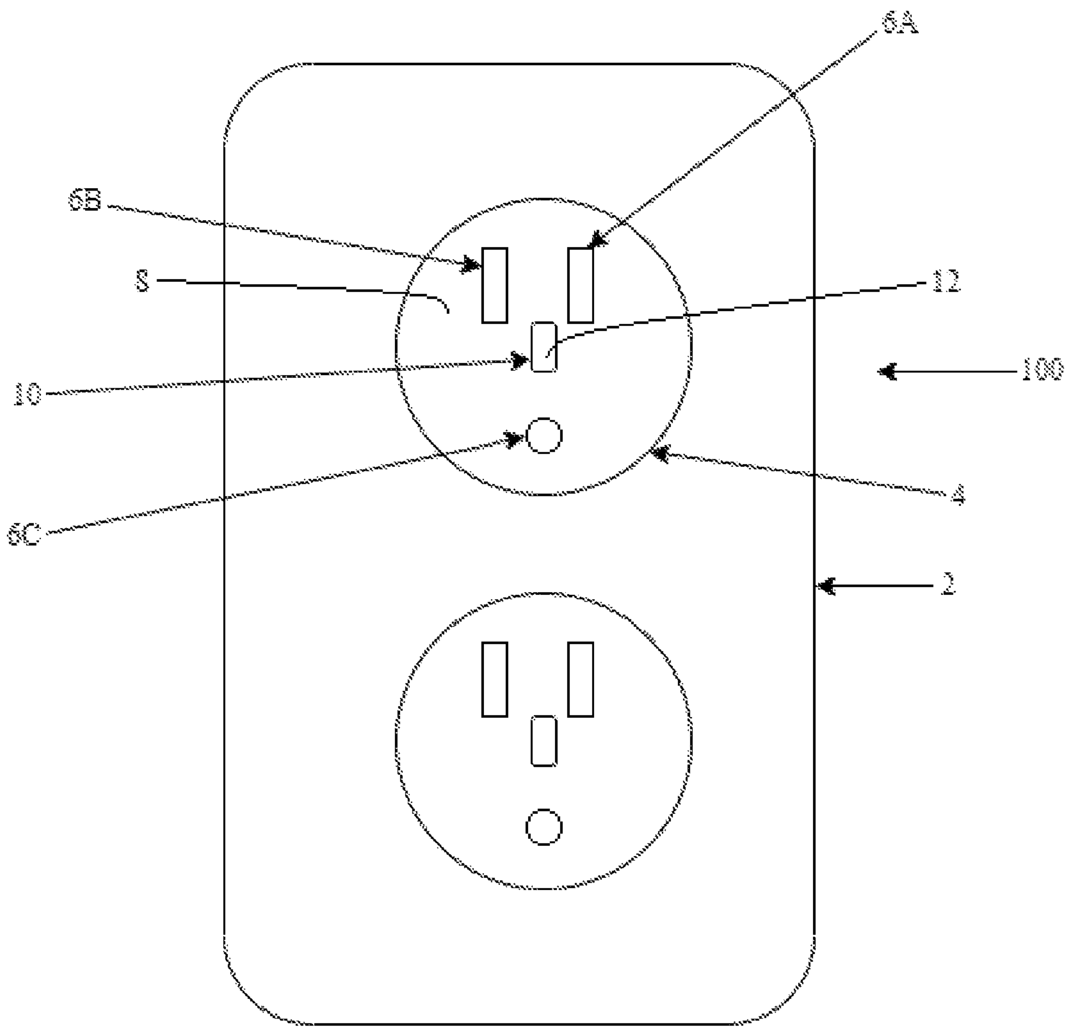
FIG. 1 is a front view of an embodiment of an electrical outlet of the present invention.

The exemplary embodiments are best understood by referring to the drawings, like numerals being used for like and corresponding parts of the various drawings. In the following description of embodiments, orientation indicators such as "top," "bottom," "up," "down," "upper," "lower," "front," "back," etc. are used for illustration purposes only; the invention, however, is not so limited, and other possible orientations are contemplated.

Referring first to FIG. 1, a front view of an embodiment an electrical outlet 100 is depicted. In one aspect, an electrical outlet 100 may replace a standard 2-pronged or 3-pronged electrical outlet. In other embodiments, an electrical outlet 100 may be adapted and configured to replace or be built into a standard or non-standard electrical outlets, including ground fault circuit interrupter (GFCI or GFI) outlets, arc fault circuit interrupter (AFCI) outlets, and other U.S. electrical outlets and international electrical outlets.

In the embodiment of FIG. 1, electrical outlet 100 comprises a front cover (face plate) 2, through which two electrical sockets 4 are accessible, as would be understood by one skilled in the art. In one embodiment, a surface 14 of face plate 2 may be substantially planar although surface 14 may comprise any topography, including, but not limited to, convex or concave. Although electrical outlet 100 is depicted in FIG. 1 as comprising two electrical sockets 4, the invention is not so limited and an electrical outlet 100 may comprise a single electrical socket 4 or more than two electrical sockets 4. In addition, while the electrical sockets 4 are depicted in FIG. 1 as being substantially round in shape, the invention is not so limited and one more electrical sockets 4 may comprise an alternative shape.

In the embodiment shown in FIG. 1, an electrical socket 4 comprises a plurality of openings (slots), (i.e., "female" connectors) 6A-C, which collectively allow for a plug 7 comprising a like number of pins (i.e., "male" connectors) 9A-C (see FIG. 1A), to engage with the electrical socket 4 for electrical communication therebetween. In the embodiment of electrical socket 4 in FIG. 1, slot 6A provides electrical connectivity to a neutral electrical lead (not shown), slot 6B provides electrical connectivity to a positive "hot" electrical lead, and slot 6C provides electrical connectivity to a grounded electrical lead, as would be understood by one skilled in the art, although the invention not limited to the embodiment shown in FIG. 1, and other slot configurations and/or electrical connectivities may be employed. In one embodiment, a surface 8 of electrical socket 4 may be substantially planar, although surface 8 may comprise any topography, including, but not limited to, convex or concave. In one embodiment, surface 8 may be substantially flush with face plate 2 surface 14, although other topographies may be employed. In various embodiments (not shown), surface 8 may at least partially protrude from surface 14 of face plate 2, or surface 8 may be at least partially recessed within surface 14 of face plate 2.

Still referring to FIG. 1, in one embodiment, electrical socket 4 comprises a coupling/communication component 10. In the embodiment of FIG. 1, the coupling/communication component 10 is disposed between slots 6A, 6B, and 6C, although other configurations may be employed. In one such embodiment, coupling/communication component 10 is disposed substantially equidistant from slots 6A, 6B, and 6C, although other configurations are contemplated. In one embodiment, a surface 12 of coupling/communication component 10 may be substantially flush with surface 8 of electrical socket 4. In other embodiments, (not shown), surface 12 of coupling/communication component 10 may be substantially flush with a non-planar surface 8 of electrical socket 4. In various embodiments (not shown), surface 12 of coupling/communication component 10 may at least partially protrude from surface 8 of electrical socket 4, or surface 12 of coupling/communication component 10 may be at least partially recessed within surface 8 of electrical socket 4.

Figure 4:
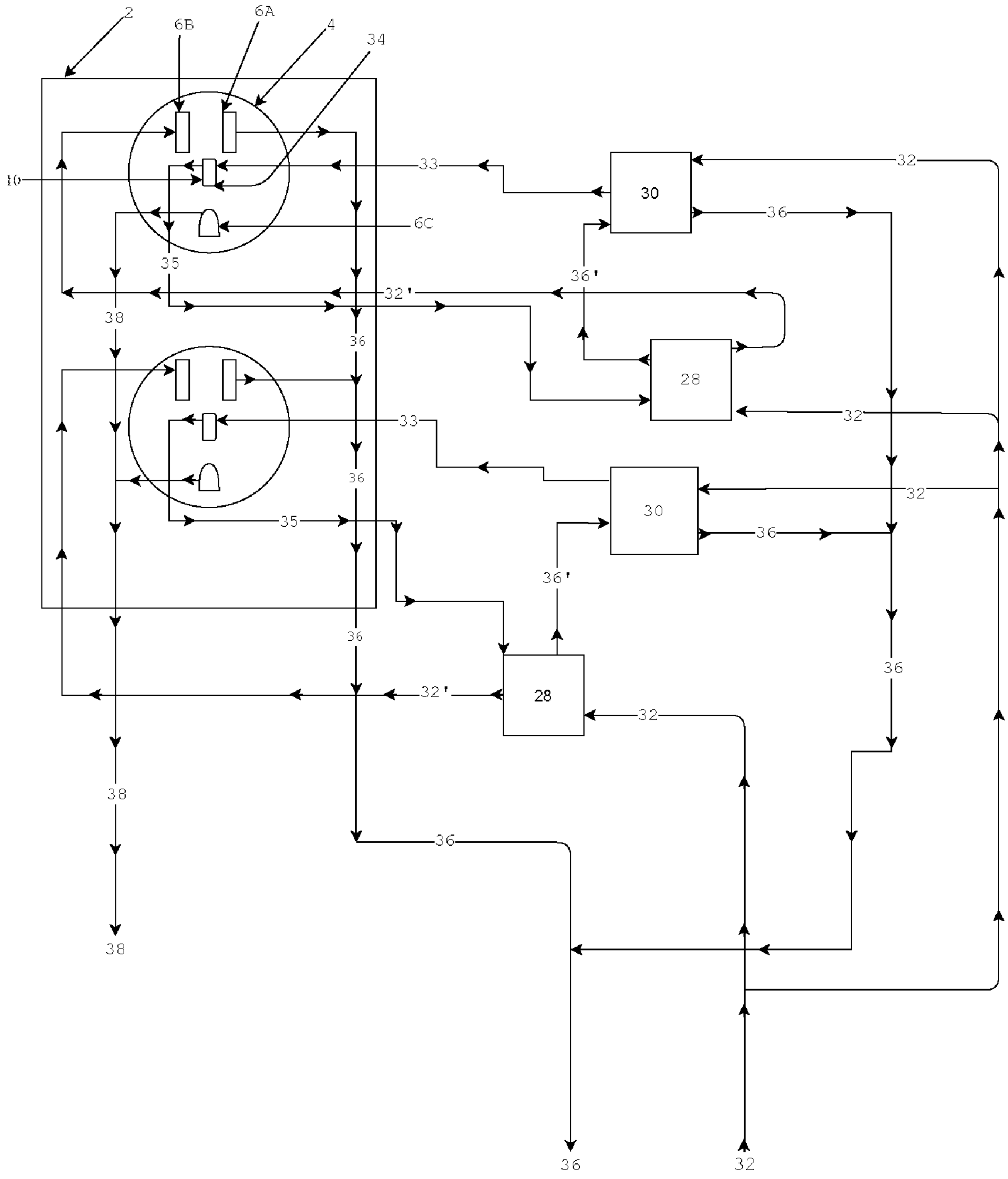
FIG. 4 is a wiring diagram for an embodiment of an electrical outlet of the present invention.
Figure 5:
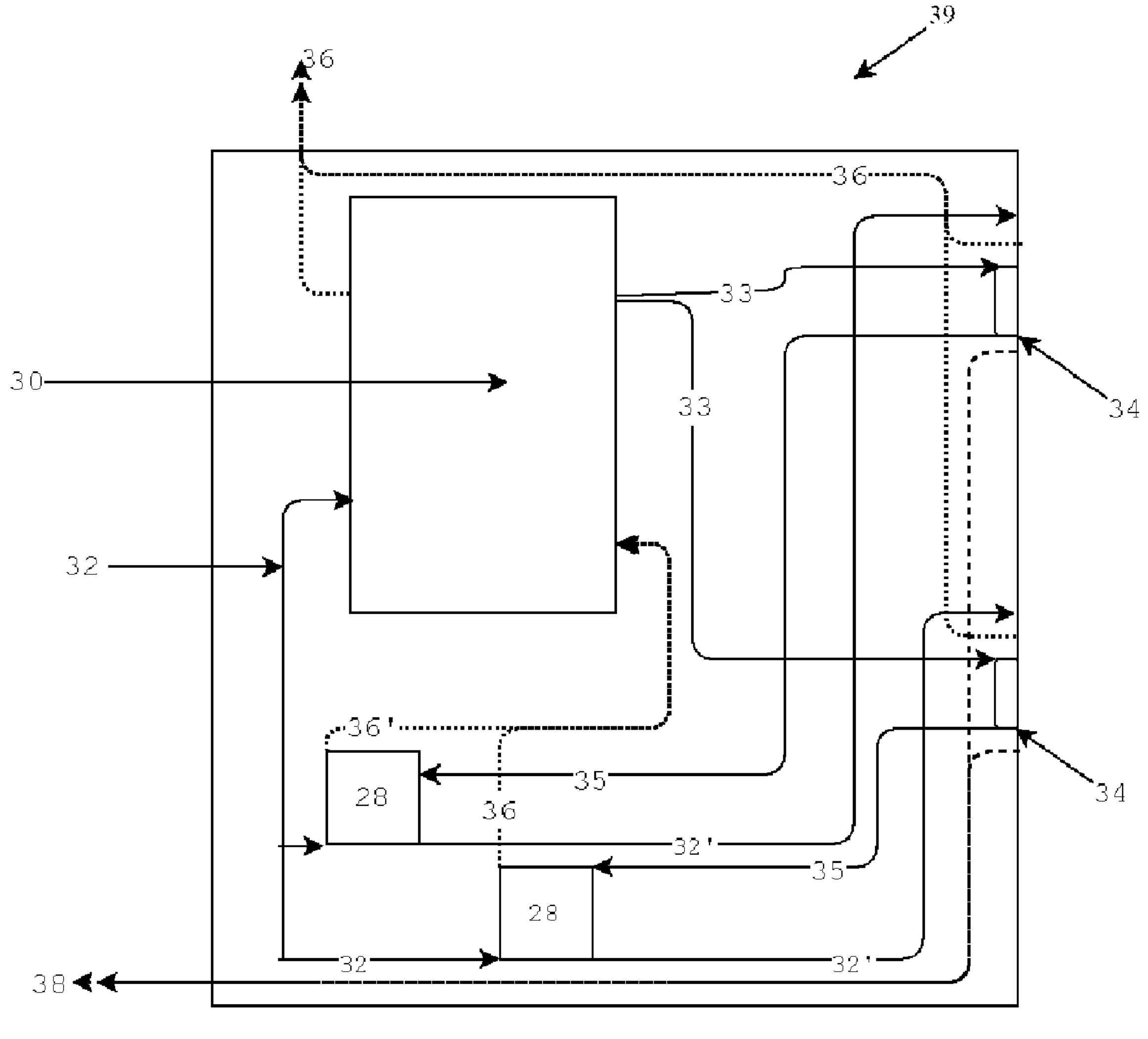
FIG. 5 is another wiring diagram for a portion of an embodiment of an electrical outlet of the present invention.

In one embodiment, a coupling/communication component 10 may comprise or be in electrical communication with an electrical switch 34 (see FIGS. 4 and 5). In one embodiment, the switch 34 comprises a reed switch. As will be described in detail below, in one embodiment, a coupling/communication component 10 is adapted and configured such that before electrical current is provided though an electrical socket 4, a plug 7 comprising a complementary coupling/communication component 11 (see FIG. 1A) must be positioned proximate coupling/communication component 10. In other embodiments (not shown), coupling/communication component 10 may comprise or be in electrical communication with a switch 34 that is actuatable vie remote activation, such as, but not limited to, a switch 34 that is actuatable via wave energy, (e.g., light waves), Bluetooth or WiFi (e.g., via a smart device (telephone, computer, tablet, etc.)) application or program, and/or comprises an RFID that is programmed to be actuated only by certain magnetic and/or RFID keys. In one aspect, remote activation control will allow an outlet 100 to supply AC electrical power only when the requisite actuation information is supplied, and can thus, for example, limit electrical usage to only those persons who are granted access.

In one embodiment (not shown), a coupling/communication component 10 may comprise a light switch 34. In one such embodiment, a coupling/communication component 10 may operate by emitting an infrared (or other non-visible or visible) light beam or acoustic wave, wherein, as described below, a complementary coupling/communication component 11 may be adapted and configured to reflect at least a portion of the emitted light beam (or acoustic wave) back to the coupling/communication component 10 (or another desired light or wave sensor (not shown) on or proximate the surface 8 of electrical socket 4). In one embodiment, such a coupling/communication component 10 may be energized (to emit a light beam or acoustic wave) by DC power or by AC power, as would be understood by one skilled in the art.

In one embodiment (not shown), a coupling/communication component 10 may comprise a switch 34 that is actuated by physical force. In one such embodiment, a coupling/communication component 10 may comprise a contact member that is outwardly biased (such as by a spring), wherein the coupling/communication component 10 is actuated by the force applied when a plug (such as a plug 7) is engaged with the electrical socket 4. In one such embodiment, the contact member may at least partially protrude from the surface 8 of the electrical socket 4, although the invention is not so limited, and other contact member orientations, such as where a contact surface of the contact member is substantially flush with the surface 8 of the electrical socket 4, or the contact member is is disposed beneath the surface 8 of the electrical socket 4, may be employed. In one aspect, such a coupling/communication component 10 may be configured and adapted such the surface of a standard plug may force the biased member into an at least partially depressed position whereby the coupling/communication component 10 is actuated. In another aspect, such a coupling/communication component 10 may be configured and adapted such that depression of the biased member below the surface of the electrical socket 4 is required to actuate the coupling/communication component 10. In such an embodiment, a plug 7A (see FIG. 1B) comprising a protruding complementary coupling/communication component 11A, when the plug 7A is engaged with the electrical socket 4, depresses the biased member, thereby actuating the coupling/communication component 10. In one embodiment, such depression forces at least a portion of the contact member below the surface of the electrical socket 4. In one embodiment, such a coupling/communication component 10 may be energized by DC power or by AC power, as would be understood by one skilled in the art.

In one embodiment, an electrical outlet 100 may be equipped with one or more indicators (not shown) that communicate the status of the electrical outlet 100 and/or the socket(s) 4 thereof. In one embodiment, such an indicator may comprise an illuminating component, such as a bulb, LED, etc. In one embodiment (now shown), a primary illuminating indicator will illuminate when AC electricity flows to an electricity converter 30, thereby providing DC electricity to the reed switch 34, and a secondary illuminating indicator (which may emit a different colored light than the primary illuminating indicator) will be triggered once a complimentary component 11 comes into proximity of the coupling/communication component 10, thereby closing the reed switch 34 to complete the DC circuit, and actuating the relay 28 as described herein. In one aspect, such an illumination component may comprise an LED that indicates that the electrical outlet 100 is energized (i.e., has AC power supplied thereto) and/or that a plug 7 is engaged with a socket 4 such that AC power is flowing from a socket 4 to a plug 7.

Figure 1A:
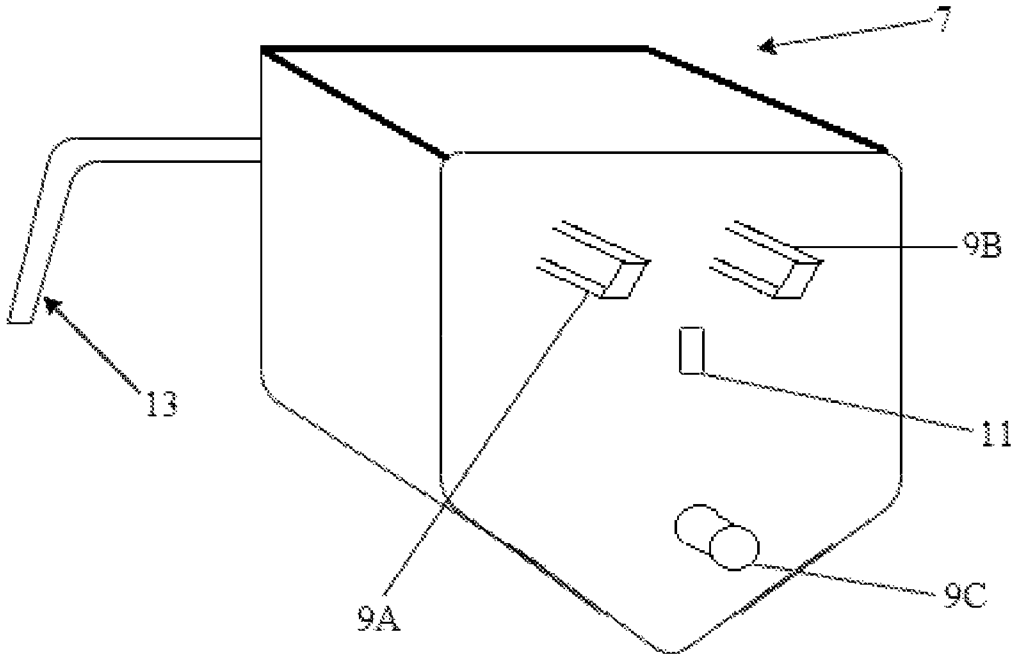
FIG. 1A is a perspective view of an embodiment of a plug of the present invention.
Figure 1B:
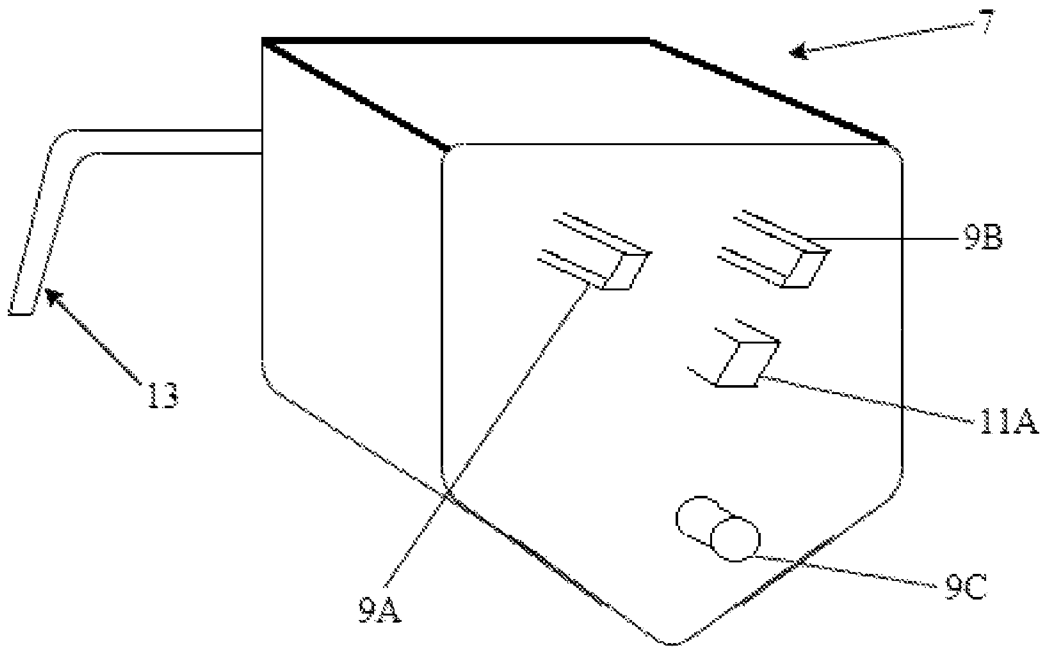
FIG. 1B is a perspective view of another embodiment of a plug of the present invention.

FIG. 1A depicts an embodiment of a plug 7 of the present invention. This embodiment is adapted and configured to cooperatively engage the embodiment of an electrical outlet 100 shown in FIG. 1. In the embodiment of electrical plug 7 depicted in FIG. 1A, pin 9A functions as a neutral electrical lead, pin 9B functions as a positive “hot” electrical lead, and slot 9C functions as a grounded electrical lead, as would be understood by one skilled in the art. In one embodiment, plug 7 comprises one or more complementary coupling/communication components 11. In one embodiment, a complementary plug coupling/communication component 11 is adapted and configured to be positioned proximate a socket 4 coupling/communication component 10 when plug 7 is actively engaged with an electrical socket 4. In one embodiment, a complementary plug coupling/communication component 11 may comprise a magnet (not separately labeled) or a ferrous material.

In other embodiments (not shown), plug complementary coupling/communication component 11 may comprise a light (e.g., visible, IR, UV) or acoustic wave receiving/reflecting member. In one such embodiment, a complementary coupling/communication component 11 may comprise a receiving/reflecting member that reflects at least a portion of the light beam or wave emitted by the coupling/communication component 10 back thereto (or another desired light or wave sensor (not shown) on or proximate the surface of electrical socket 4 (not separately labeled)). In another embodiment, shown in FIG. 1B, a complementary coupling/communication component 11 may protrude from the surface of a plug 7. In such an embodiment, engagement of a plug 7 with an electrical socket 4 actuates the coupling/communication component 10 by physical impingement of the complementary coupling/communication component 11 with the coupling/communication component 10. In one aspect, a complementary plug coupling/communication component 11 being disposed proximate or engaged with a socket 4 coupling/communication component 10 enables a socket 4 to flow electrical current to a plug 7, as described below.

Figure 1C:
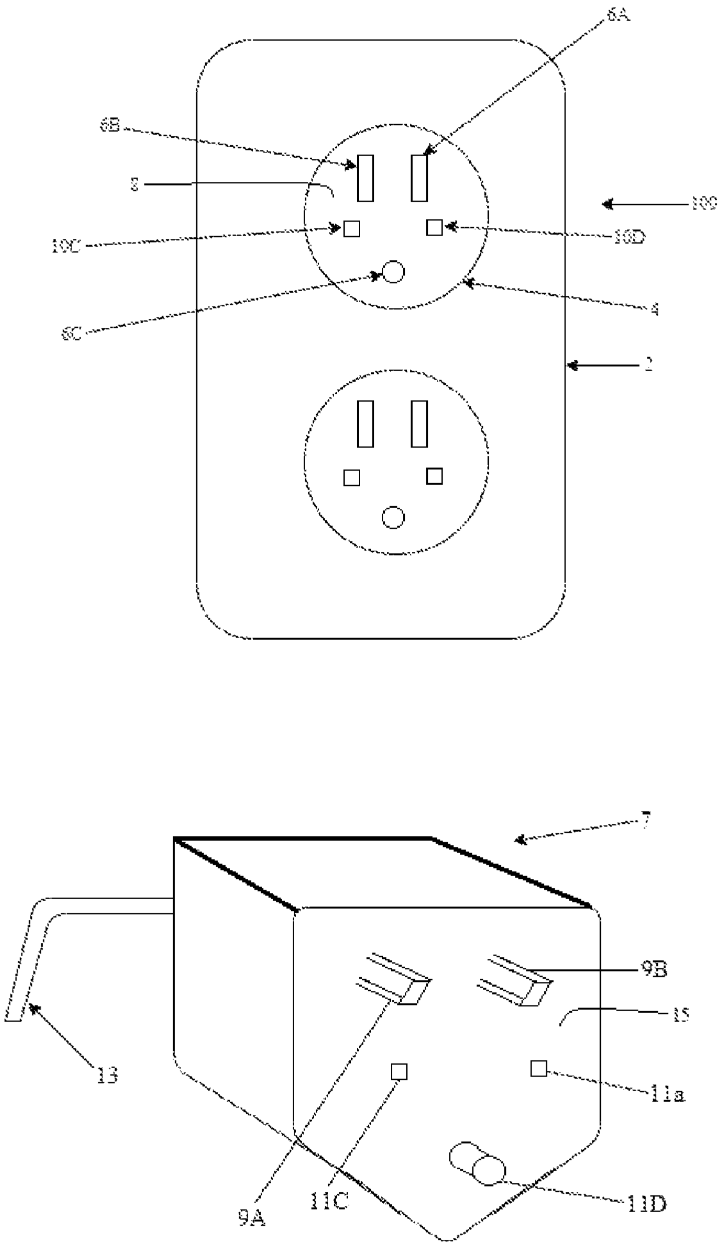
FIG. 1C is a front view of an embodiment of an electrical outlet of the present invention and a perspective view of an embodiment of a corresponding plug of the present invention.

In one embodiment, shown in FIG. 1C, a coupling/communication component 10 may comprise a plurality of electrical contact points 10C, 10D, and a complementary coupling/communication component 11 may comprise a plurality of electrical contact points 11C, 11D which are connected in such a manner as to conduct electricity therebetween. In one such embodiment, an electrical outlet 100 would function by providing electrical current (AC or DC) through electrical contact point 10C, whereby upon engagement of plug 7 with socket 4, electrical contact points 11C, 11D would abut electrical contact points 10C, 10D, respectively, and current would flow to electrical contact point 11C, and on to electrical contact point 11D, which would complete the electrical circuit by passing the electrical current on to electrical contact point 10D. In one aspect, outlet 100 would only provide AC via slots 6A and 6B to plug 7 when the engagement of the electrical contact points 10C, 10D, and 11C, 11D creates a completed electrical circuit which allows current to flow to a relay (not shown) in outlet 100. In one embodiment, such a relay may be configured whereby completion of the electrical circuit on a socket 4 allows for AC provision only through that socket 4, or allows for AC provision through the entire outlet 100. In various aspects, such an electrical circuit completion system may operate on DC via rectifier or other AC converting electronic system (not shown in FIG. 1C), or run solely on AC. In various embodiments, electrical contact point 11C and 11D may be electrically connected by wiring (not shown) disposed at least partially within plug 7, or by an electrically conductive material (such as a flat strip, not shown) at least partially disposed on the face (not separately labeled) of plug 7, although the invention is not so limited and other connectivity mechanisms may be employed to electrically connect electrical contact point 11C and 11D. In various embodiments, electrical contact points 10C, 10D, 11C and/or 11D may be biased outward (such as by a spring) to facilitate contact between corresponding contact points. In various embodiments, electrical contact points 10C and/or 10D may be recessed below the surface 8 of the socket 4, and/or electrical contact points 11C and/or 11D may be recessed below the surface 15 of plug 7, and, complementarily, electrical contact points 10C and/or 10D may protrude from the surface 8 of the socket 4, and/or electrical contact points 11C and/or 11D may protrude from the surface 15 of plug 7. In one embodiment (not shown), such a direct contact circuit may extend from within the plug 7, into and around an extension cord, wrapped, for example, in a helical manner around the extension cord and along the length thereof, as described herewith, to provide and extension of the safety circuit through the length of the extension cord.

In another embodiment, an electrical outlet 100 may utilize a coupling/communication member 10 and a complementary coupling/communication member 11 that function through utilization of the Hall effect, i.e., that operate by the sensing of a magnetic field difference. In one aspect, such a complementary coupling/communication member 11 may be adapted and configured to produce a magnetic field (e.g., comprise a magnet), and such a coupling/communication member 10 may comprise a magnetic field (Hall effect) sensor (e.g., a digital magnetic field sensor) (not shown), such that, when complimentary coupling/communication member 11 is within proximity of coupling/communication member 10, the Hall effect sensor senses a magnetic field difference created by the magnet or electromagnetic device, the relay 28 is thereby actuated, (by the magnetic field sensor sensing the proximately positioned magnet), and AC power flows through the relay 28, and through outlet socket 4 to the plug 7.

In one embodiment, a plug 7 comprises a cord 13, through which electrical wires connected to pins 9A-C are in electrical communication with an electrical device (not shown) when a plug 7 is actively engaged with an electrical socket 4 of an electrical outlet 100. The invention, though, is not limited to the embodiment shown in FIG. 1A, and other pin configurations and/or electrical connectivities may be employed.

In one embodiment (not shown), a plug 7 may comprise a stand-alone device that is not directly connected to an electrical device. In such an embodiment, a plug 7, in lieu of comprising a plug cord 13, may comprise a "back" side that includes slots (or other means) for connecting a plug 7 to a standard electrical plug (not shown). In this manner, the plug 7 constitutes an "adapter" that allows for retrofitting a standard plug to allow for safe provision of electrical current to the electrical device without having to replace the standard plug thereof. In still another embodiment (not shown), a plug 7, in lieu of being directly connected to an electrical device through a plug cord 13, may be disposed on one end of an electrical extension cord (not shown), as would be understood by one skilled in the art.

Figure 2:
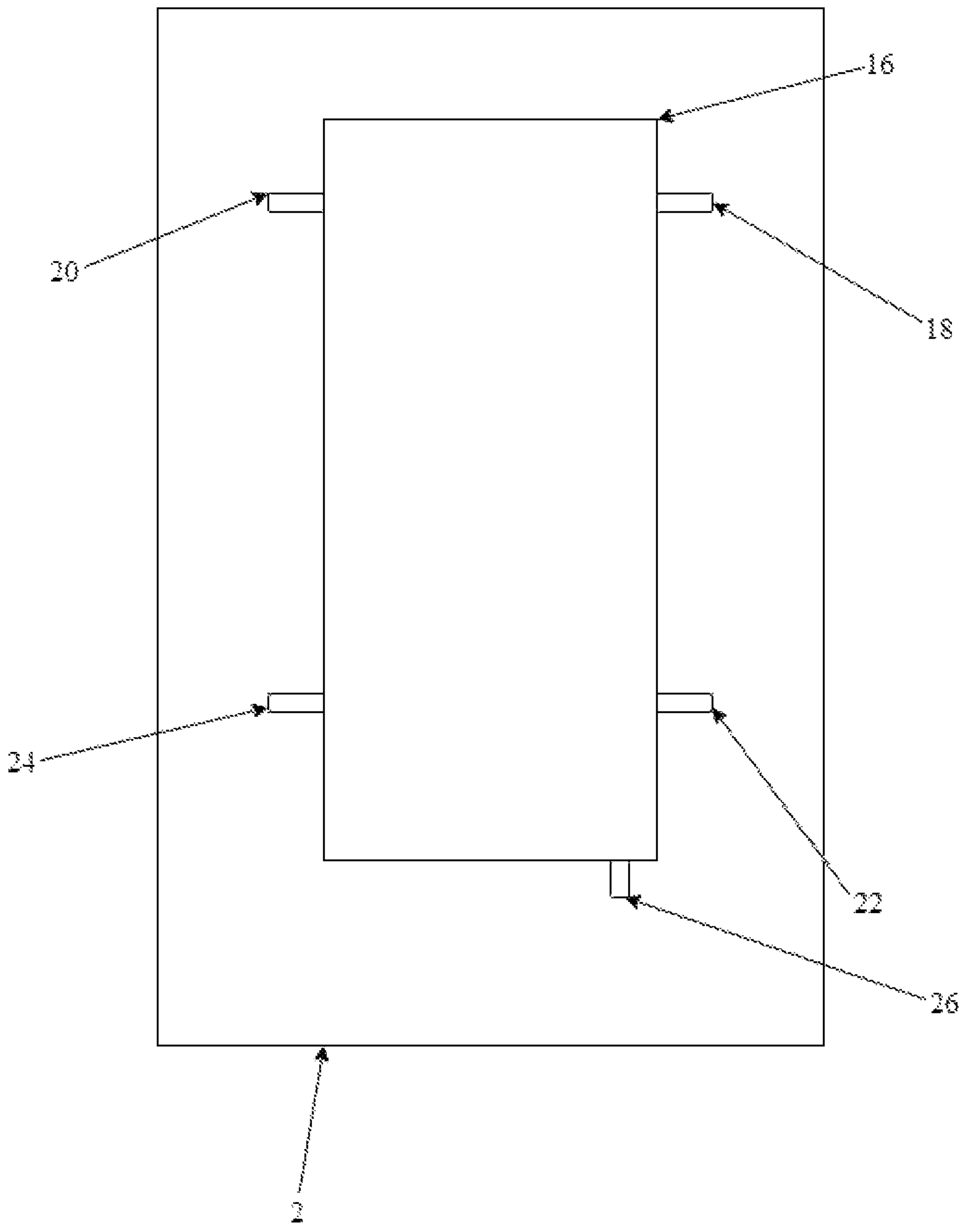
FIG. 2 is a rear view of an embodiment of an electrical outlet of the present invention.

FIG. 2 depicts a back view of an embodiment of an electrical outlet 100 is depicted. In this embodiment, an outlet body 16, which comprises socket(s) 4 (not visible in FIG. 2), comprises a plurality of electrical leads, including, but not limited to, one or more neutral line in 18, hot line in 20, neutral load line 22, hot load line 24, and ground line 26. In one embodiment, one or more sockets 4 may be integral to outlet body 16, and/or one or more sockets 4 may be directly or indirectly connected to outlet body 16. In one embodiment, one or more such electrical leads may be integral to outlet body 16, and/or one or more such electrical leads may be directly or indirectly connected to outlet body 16. As would be understood by one skilled in the art, such electrical leads may comprise any useful materials that conduct electricity.

Figure 3:
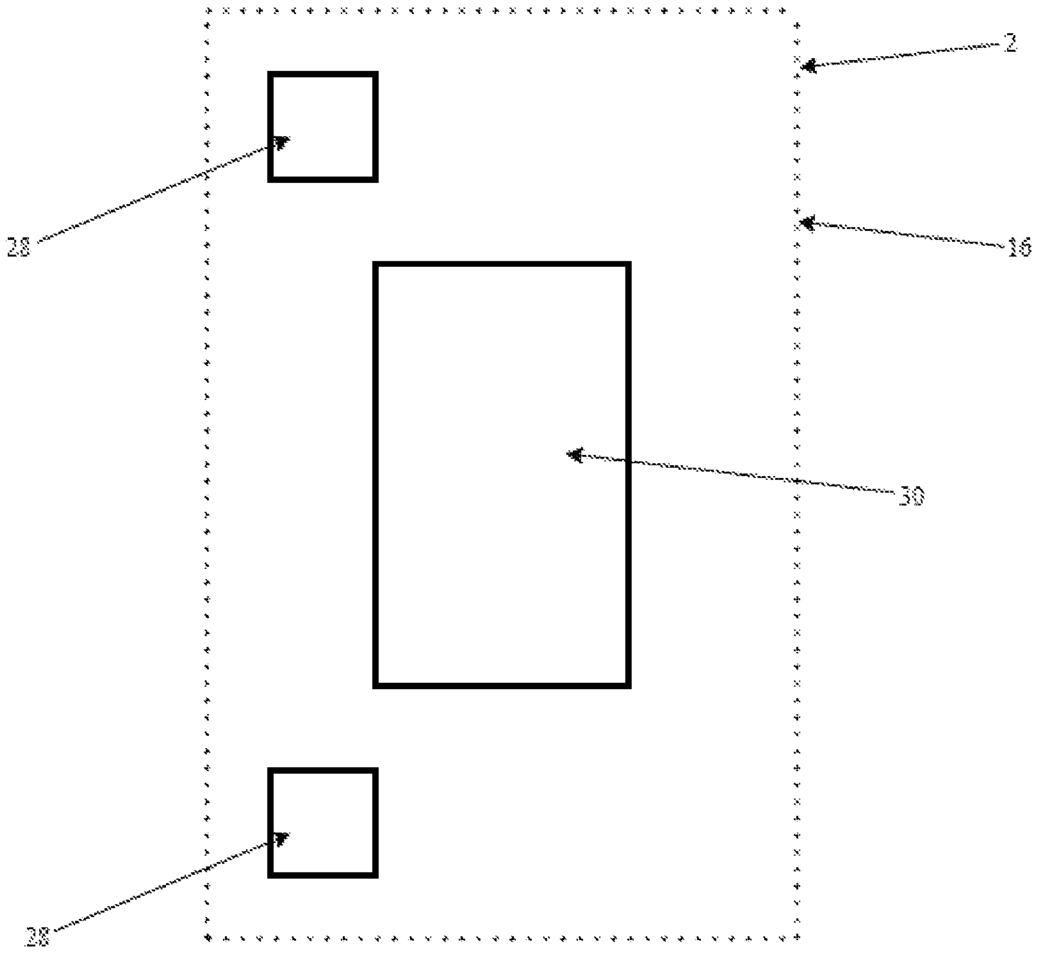
FIG. 3 is a schematic representation of a portion of an electrical outlet of the present invention.

FIG. 3 depicts a schematic view of an embodiment of an electrical outlet 100 outlet body 16. In one embodiment, an outlet body 16 comprises one or more electrical relay components (relays) 28 and one or more AC to DC electricity converters (rectifiers and/or step-down converters, in etai—oxide—semiconductor field-effect transistors (MOSFETs), thermistors/transistors/thyristors) 30. In one embodiment, a relay 28 may comprise a standard electrically/electromagnetically operated switch, or any component that can be operated to make and/or break electrical contacts. In one embodiment, a relay 28 may comprise a 4 or 5 pin/terminal relay. In one embodiment, a rectifier 30 may comprise a standard single wave, full wave or half wave rectifier utilizing semiconductor diodes, or may comprise a rectifier utilizing other components, including, but not limited to, solid-state switches (thyristors), MOSFETs, thermistors, transistors, buck converters, etc., as would be understood by one skilled in the art. In one aspect, the electronic components described herein may comprise single phase or three phase electronics, as would be understood by one skilled in the art. As shown in detail in FIG. 4, relay(s) 28 and rectifier(s) 30 comprise a portion of the electrical wiring system which is utilized to provide electrical power to socket(s) 4 and/or prevent electrical power from being provided to socket(s) 4.

Referring now to FIG. 4, an embodiment of a wiring scheme for an electrical outlet 100 is shown. In one embodiment, AC power 32 from an AC power source (not shown) provides AC power to one or more relays 28 and one or more rectifiers 30. As described below, in one embodiment, DC electrical power is indirectly provided by a rectifier 30 to a relay 28 via a reed switch 34. In one embodiment, the rectifier 30 provides 12V DC electrical power to a relay 28; however, the invention is not so limited and other DC power voltages may be employed. While the embodiment depicted in FIG. 4 utilizes a separate rectifier 30 to provide DC power to each relay 28, the invention is not so limited and a single rectifier 30 may be employed to provide DC power to a plurality of relays 28. In the embodiment of FIG. 4, a rectifier 30 provides DC power to a reed switch 34 within or proximate coupling/communication component 10. As would be understood by one skilled in the art, a reed switch is an electrical switch operated by an applied magnetic field. In other embodiments, any type of magnetically or electromagnetically actuated switch 34 may be employed. In one embodiment, a reed switch 34 of coupling/communication component 10 is adapted and configured such that the switching mechanism therein resides in an open position (no current flow) when there is no magnetic field present. Conversely, in one embodiment, when a magnetic field is present, DC power flows from the reed switch 34 to relay 28. In one aspect, as is described in detail below, a magnetic field is applied to the reed switch 34 when a plug 7 is engaged with socket 4 such that a magnetic coupling/communication component 11, complementary to coupling/communication component 10, is provided proximate coupling/communication component 10.

Still referring to FIG. 4, in one embodiment, DC power may be provided by a rectifier 30 to a reed switch 34 of, or in electrical communication with, coupling/communication component 10 (arrow 33), wherein, when the reed switch 34 is closed (as described below), DC power is provided from the reed switch 34 to a relay 28 (arrow 35). Upon provision of DC power from the reed switch 34 to a relay 28, the relay 28 is actuated, whereby positive "hot" AC power is provided to that socket 4 slot 6B (arrow 32'), and a neutral current return (arrow 36') is provided to that rectifier 30. In one aspect, in this manner, AC power is only provided to a socket 4 when the associated reed switch 34 is in a closed configuration, which occurs only when the coupling/communication component 10 is magnetically coupled to a complementary coupling/communication component of a plug 7 engaged with the socket 4. In one embodiment, this magnetic coupling occurs when plug 7 complementary coupling/communication component 11 comprises a magnet (not separately labeled), and engagement of plug 7 with socket 4 positions such a magnet proximate the reed switch 34 electrically connected to that socket 4. In one aspect, as depicted in FIG. 4, a socket 4 operates in a standard fashion wherein slot 6A provides for a neutral 36 return and slot 6C provides ground return 38.

In other embodiments (not shown), a wiring scheme for an electrical outlet 100 may be configured such that DC power is provided to socket(s) 4, and therefore to plug(s) 7. In one aspect, such a configuration utilizes an AC input of which at least a portion of the AC power input is converted to DC power and then provided to socket(s) 4. In another aspect, such a configuration utilizes DC power input. In other embodiment (not shown) a wiring scheme for an electrical outlet 100 may be configured such that AC or DC power is provided to a coupling/communication component 10. In one such embodiment, a relay, such as, but not limited to, a relay 28, may be adapted and configured such that a DC power input may actuate it.

In FIG. 5, a detailed schematic wiring diagram of a portion of an embodiment of an electrical outlet 100 of the present invention is depicted. In the embodiment of FIG. 5, an electrical outlet 100 comprises at least one electrical safety component assembly 39 that includes one or more rectifiers 30, one or more relays 28, and one or more reed switches 34, in electronic/electrical communication as shown therein. In one embodiment, an electrical safety component assembly 39 may be located proximate socket(s) 4. In one embodiment, an electrical safety component assembly 39 may be at least partially contained within a junction box 52. (See FIGS. 6 and 7). In one embodiment, a rectifier 30 comprises a printed circuit board (PCB). In one embodiment, each reed switch 34 is disposed proximate or within a coupling/communication component 10 (not shown in FIG. 5).

Figure 6:
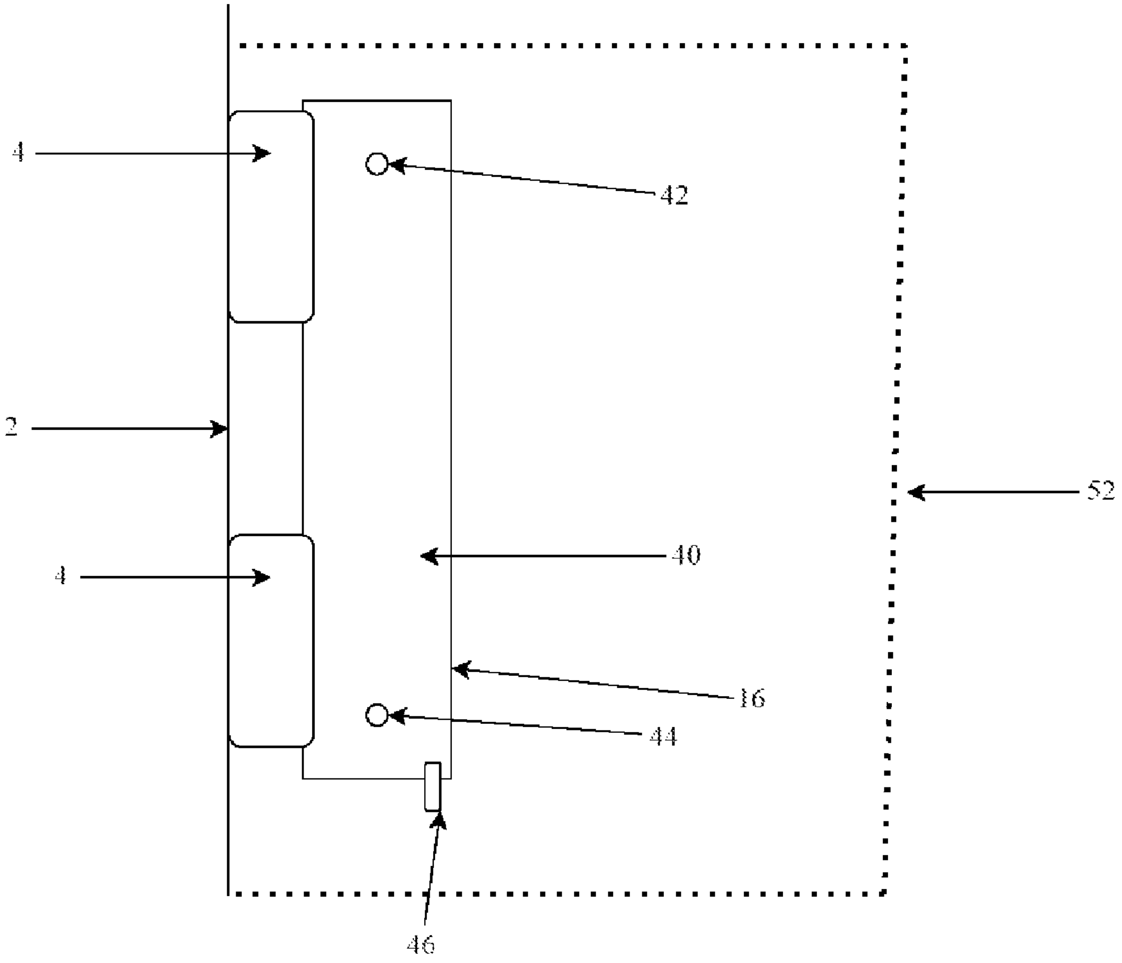
FIG. 6 is a "hot side" side view of an embodiment of an electrical outlet of the present invention.
Figure 7:
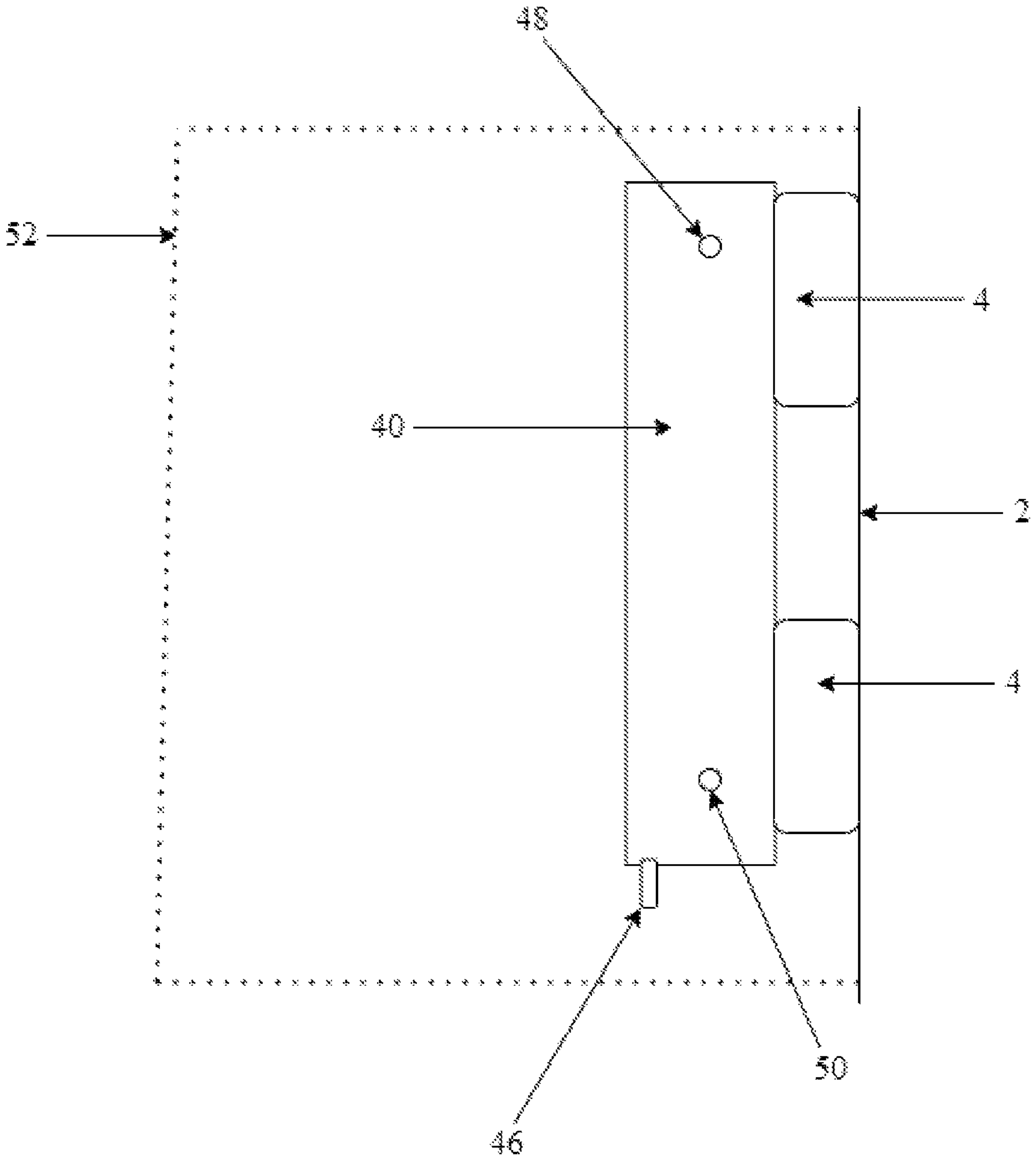
FIG. 7 is a "neutral side" side view of an embodiment of an electrical outlet of the present invention.

FIG. 6 shows a "hot side" side view of an embodiment of an electrical outlet 100 of the present invention. In the embodiment of FIG. 6, positioned behind the face plate 2 are two sockets 4. In one embodiment, positioned behind the sockets 4 is a terminal housing 40 (which may be integral to the outlet body 16) which at least partially contains the electrical connections 42 and 44 for hot line in 20 and hot load line 24, respectively In one embodiment, an electrical safety component assembly 39 may be at least partially contained within a terminal housing 40. In one embodiment, a ground connection 46, for ground line 26, is at least partially contained within a terminal housing 40. As shown in the opposing view depicted in FIG. 7, in one embodiment, a terminal housing 40 may similarly at least partially contain an electrical connection 48 for neutral line in 18, and/or an electrical connection 50 for neutral load line 22.

In various embodiments (not shown), electrical outlets 100 may be configured (such as by utilization RFID, Bluetooth, WiFi, or other wireless communication technology) to prevent theft of electricity and/or restrict use of a particular or multiple sockets 4 and/or electrical outlets 100 to only authorized users. In one aspect, such an outlet 100 could be configured to be wirelessly actuated to provide AC upon receipt of an authorizing signal, which could comprise an authorization code and/or payment information. In one such embodiment, such an electrical outlet 100 could be configured to accept authorization/payment when a transmitting device, such as, but not limited to, a "smart phone" is positioned proximate the outlet 100 or a stand-alone device (not shown) that is in informational communication with the outlet 100. In one aspect, such a payment system could be configured to provide electricity at a flat rate or on a usage (such as KW) basis.

In one aspect, an outlet 100 can incorporate any currently known or later discovered safety features, such as, but not limited to, GFCI, AFCI, and/or other automated self-testing features used to ensure the safety of the system and its functionality as previous and future art may detail. In various embodiments (not shown), an outlet 100 may comprise a thermistor or temperature safety fuse or device to shut the electrical provision system down and/or have a fail-safe feature. In one aspect, such an embodiment may comprise a control component (digital or analog) that operates to stop the flow of electricity like a GFCI, wherein if the positive and neutral currents are unbalanced, the control component is "tripped" and may be reset (e.g., via breaker reset, "pop-up" button depression, etc.) when the system is in balance, or such a control component may comprise an impedance sensing/measuring device that is "tripped" when an impedance level outside a set threshold is recognized, the control component is "tripped" and may be reset (e.g., via breaker reset, "pop-up" button depression, etc.) when the system is in balance. Such embodiments may be used in conjunction with a device that self tests and/or detects circuit interruption (GFCI) or potential high/low ohms outside of a set amount indicating a short in the system, thereby preventing the outlet from activating and sending the electricity to the outlet socket 4 when there is a device plugged in or if there is an extension cord, surge protector or power strip being used.

Figure 8:
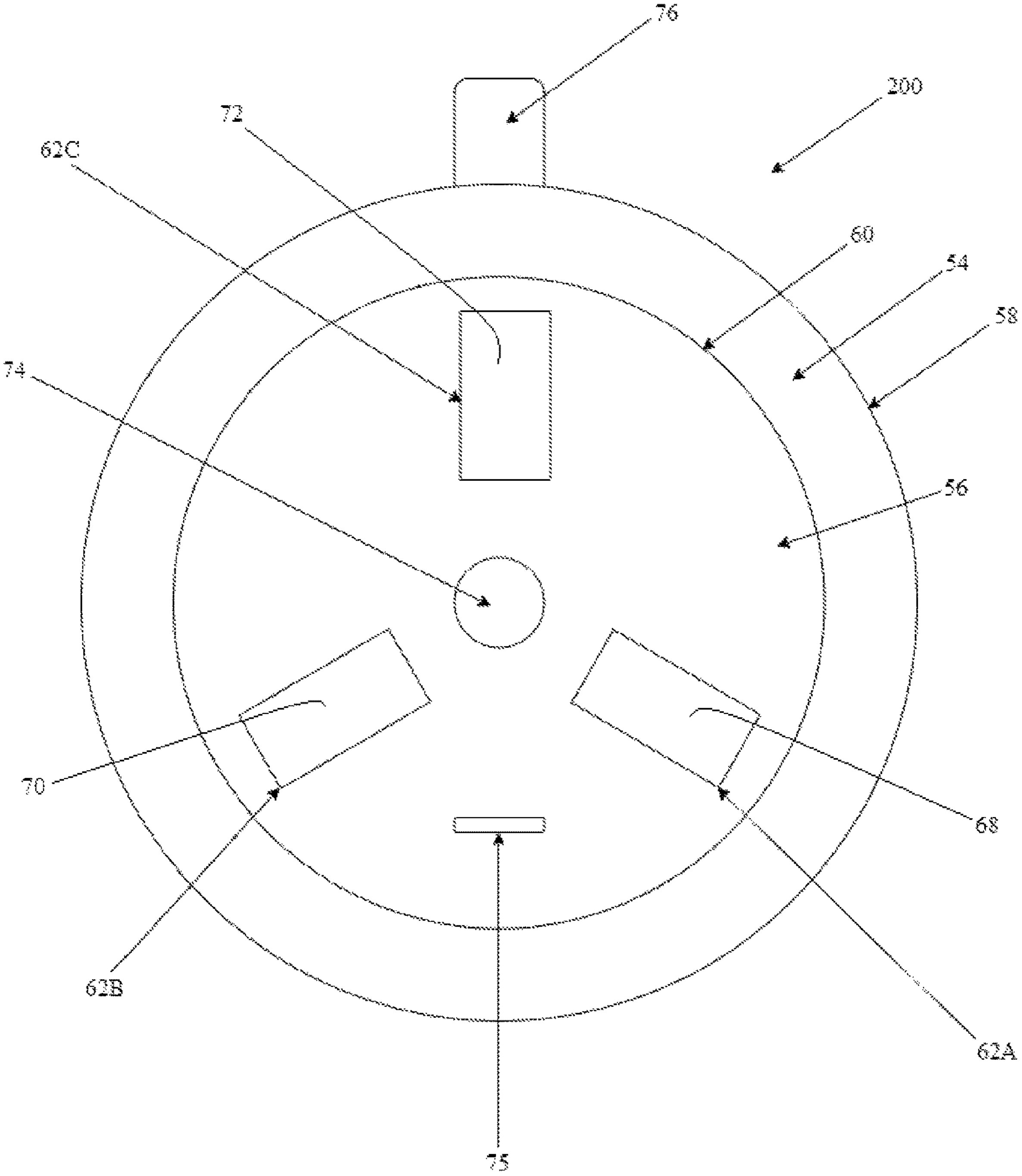
FIG. 8 depicts an embodiment of an electrical connection disengaging outlet of the present invention.

Referring now to FIG. 8, an embodiment of a disengaging electrical outlet 200 of the present invention is shown. In one embodiment, a disengaging electrical outlet 200 comprises a front cover (face plate) 54. In the embodiment shown in FIG. 8, face plate 54 comprises a substantially round geometry; however, the invention is not so limited and other geometries of face plate 54 may be employed. In one embodiment, a surface 56 of face plate 54 may be substantially planar although surface 56 may comprise any topography, including, but not limited to, convex or concave. In one embodiment, as shown in FIG. 8, a face plate 54 may comprise a recessed edge, such as, but not limited to, recessed edge 58. In one embodiment, a recessed edge 58 extends completely circumferentially about face plate 54, while in other embodiments (not shown), a recessed edge 58 may extend about only a portion or portions of a face plate 54. In one embodiment, as shown in FIG. 8, a face plate 54 may comprise one or more raised sections 60, such as, but not limited to, the substantially circular raised section 60 depicted in FIG. 8.

Still referring to FIG. 8, in one embodiment, a disengaging electrical outlet 200 comprises a positive (hot) electrical contact member 62A, a neutral electrical contact member 62B, and a grounding contact member 62C. In one embodiment, a contact member 62A, 62B, and/or 62C may comprise substantially planar front services 68, 70, and 72, respectively. In one embodiment, a contact member 62A, 62B, and/or 62C may be biased outward by a biasing member (not shown), such as, but not limited to, a spring. In other embodiments (not shown), contact members 62A, 62B, and/or 62C may comprise substantially non-planar front surfaces, including, but not limited to, front surfaces that comprise protrusions and/or indentations that allow for complementary engagement thereto with a corresponding disengaging electrical receptacle (plug) contact member (described in regard to FIG. 9, below). In one embodiment, one or more of front surfaces 68, 70, and 72 comprises an electrically conductive material, including, but not limited to, a metal and/or metal alloy comprising aluminum, copper, brass, silver, tin, platinum or gold.

In one embodiment, a disengaging electrical outlet 200 may comprise a disengaging outlet coupling/communication component 75. In one embodiment, a disengaging outlet coupling/communication component 75 may be adapted and configured, and function, like a coupling/communication component 10 or 10C/10D described above and depicted in FIGS. 1, 1C and 4. In one embodiment, a disengaging outlet coupling/communication component 75 is configured and adapted to interact with a disengaging receptacle coupling/communication component 95 (see FIG. 9) described below. In other embodiments, (not shown) coupling/communication component 75 may comprise a switch 34 that is actuatable via activation proximately or remotely, such as, but not limited to, a switch 34 that is actuatable via wave energy, (e.g., light waves), Bluetooth or WiFi, and/or comprises an RFID that is programmed to be actuated only by certain magnetic and/or RFID keys. In one aspect, remote activation control will allow a disengaging electrical outlet 200 to supply AC power only when the requisite actuation information is supplied, and can thus, for example, limit electrical usage only those persons who are granted access, as described above with regard to electrical outlet 100.

In one embodiment, a disengaging electrical outlet 200 comprises one or more attachment members 74. In one aspect, an attachment member 74 may comprise any mechanism or means for reversibly maintaining positioning of a disengaging electrical receptacle (plug) 300 (see FIG. 9) proximate disengaging electrical outlet 200. In one embodiment, an attachment member 74 may comprise a magnet. In one embodiment, such a magnet may comprise an electromagnet. In one aspect, an attachment member magnet 74 may be disposed such that either pole (north or south) is exposed. Accordingly, in an embodiment comprising a plurality of attachment member magnets 74 and a plurality of disengaging plug attachment members 96 (see below and FIG. 9), varying of exposed magnetic poles allows for control of orientation of engagement between a disengaging electrical outlet 200 and a disengaging electrical receptacle plug 300; i.e., outlet and plug can only be successfully engaged when it is lined up correctly. In other embodiments (not shown), an attachment member 74 may comprise any type of connection device that allows for reversible attachment thereto, which is readily detachable by the application of force in a direction away therefrom. Examples of such connection devices include, but are not limited to, a snap-fit connector, Velcro®, alignment tabs, pins, or any other useful known connection mechanism. In the embodiment depicted in FIG. 8, the attachment member 74 is centrally located on disengaging outlet face plate 54; however, the invention is not so limited and attachment member(s) 74 may be disposed at any suitable location on disengaging outlet face plate 54. In one aspect, attachment member(s) 74, recessed edge 58, and/or raised section(s) 60 constitute a disengaging electrical outlet 200 attachment mechanism (not separately labeled). In one embodiment, a disengaging electrical outlet 200 comprises an incoming electrical power component 76, which allows for wired connection of an AC power source (not shown), directly or indirectly, to the disengaging electrical outlet 200.

In one embodiment, a disengaging electrical outlet 200 comprises an electrical configuration similar to that of an electrical outlet 100, as described above and depicted in FIGS. 4 and 5. Thereby, a disengaging electrical outlet 200 may be adapted and configured to provide electrical current only when the coupling/communication component 75 is magnetically coupled to a complementary coupling/communication component 95 of a receptacle 300, (described below and shown in FIG. 9).

In various embodiments (not shown), a disengaging electrical outlet 200 may be adapted and configured to operate solely or partially on DC electrical power. Such embodiments may be useful when a local source of DC electrical power is available, such as in proximity to a DC electrical storage unit (e.g., battery unit) or DC power generation unit (e.g., solar or wind turbine unit). In one such embodiment, in lieu of providing AC electrical power to a disengaging electrical outlet 200, DC electrical power may be provided thereto, wherein when a coupling/communication component 75 is magnetically coupled to a complementary coupling/communication component 95 of a receptacle 300, DC electrical power is provided by a relay 28 to disengaging electrical contact members 62A and 62B. In another such embodiment, which may be referred to as a "hybrid" disengaging electrical outlet 200, both AC and DC electrical power may be provided thereto. In such an embodiment, a disengaging electrical outlet 200 may further comprise, or be in informational communication with, an input power control unit that can be operated to switch between providing AC electrical power via the disengaging electrical outlet 200 and providing DC electrical power via the disengaging electrical outlet 200, as would be understood by one skilled in the art.

Figure 9:
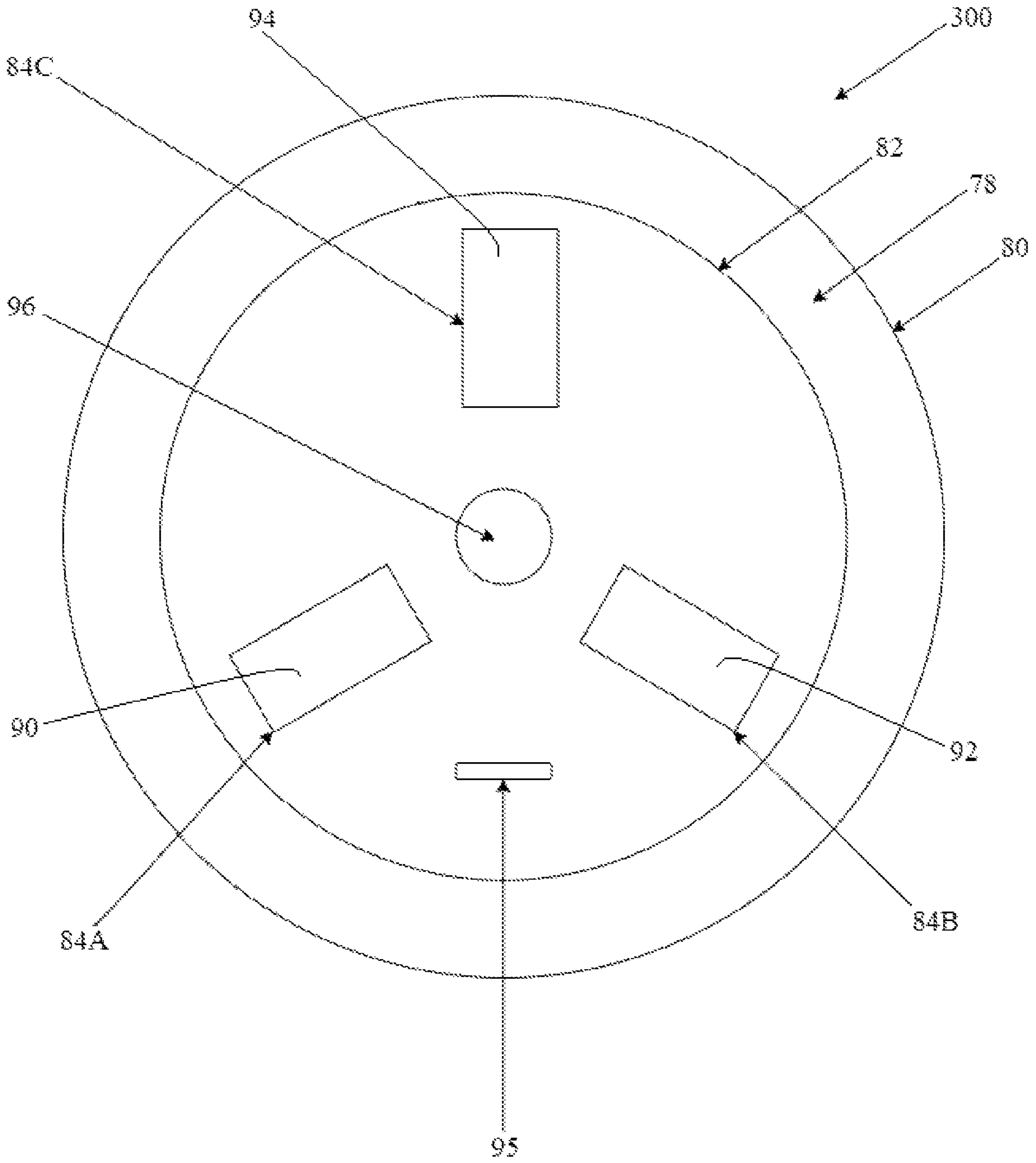
FIG. 9 depicts an embodiment of an electrical connection disengaging receptacle/plug of the present invention.

Referring now to FIG. 9, an embodiment of a disengaging electrical receptacle (plug) 300 of the present invention is depicted. In one embodiment, a disengaging electrical plug 300 comprises a face plate 78. In one embodiment, an electrical plug 300 face plate 78 comprises a geometry complementary to a disengaging electrical outlet 200 to which it is to be attached, although the invention is not so limited and other face plate 78 topographies may be employed. In one embodiment, as shown in FIG. 9, an electrical plug face plate 78 may comprise a raised edge, such as, but not limited to, raised edge 80. In one embodiment, a raised edge 80 extends completely circumferentially about face plate 78, while in other embodiments (not shown), a raised edge 80 may extend about only a portion or portions of a face plate 78. In one embodiment, as shown in FIG. 9, a face plate 78 may comprise one or more raised sections 82, such as, but not limited to, the substantially circular raised section 82 depicted in FIG. 9.

In one embodiment, a plug face plate 78 raised edge 80 may be configured complementarily to a disengaging outlet face plate 54 recessed edge 58, and/or a plug face plate 78 recessed section 82 may be configured complementarily to a disengaging outlet face plate 54 raised section 60. In one aspect, this allows for cooperative engagement between plug face plate 78 and outlet face plate 54, as described in detail below. In one embodiment, disengaging plug face plate 78 is substantially concave and disengaging outlet face plate 54 is substantially convex.

In one embodiment, a disengaging electrical plug 300 comprises a hot electrical contact member 84A, a neutral electrical contact member 84B, and a grounding contact member 84C. In one embodiment, a contact member 84A, 84B, and/or 84C may comprise substantially planar front services 90, 92, and 94, respectively. In one embodiment, a contact member 84A, 84B, and/or 84C may be biased outward by a biasing member (not shown), such as, but not limited to, a spring. In other embodiments (not shown), contact members 84A, 84B, and/or 84C may comprise substantially non-planar front surfaces, including, but not limited to, front surfaces that comprise protrusions and/or indentations that allow for complementary engagement thereto with a corresponding disengaging electrical outlet contact member 75 (described in regard to FIG. 8, above).

In one embodiment, a disengaging electrical plug 300 may comprise a disengaging plug coupling/communication component 95. In one embodiment, a disengaging plug coupling/communication component 95 may be adapted and configured, and function, like a coupling/communication component 10 described above and depicted in FIGS. 1 and 4. In one embodiment, a disengaging plug coupling/communication component 95 is configured and adapted to interact with a disengaging outlet coupling/communication component 75 (see FIG. 8) described above.

In one embodiment, a disengaging electrical plug 300 comprises one or more attachment members 96. In one aspect, an attachment member 96 may comprise any mechanism or means for reversibly maintaining positioning of a disengaging electrical outlet 200 (see FIG. 8) proximate disengaging electrical plug 300. In one embodiment, an attachment member 96 may comprise a magnet. In other embodiments (not shown), an attachment member 96 may comprise any type of connection device that allows for reversible attachment thereto, which is readily detachable by the application of force in a direction away therefrom. Examples of such connection devices include, but are not limited to, a snap-fit connector, Velcro®, alignment tabs, pins, or any other useful known connection mechanism. In the embodiment depicted in FIG. 9, the attachment member 96 is centrally located on disengaging outlet face plate 78; however, the invention is not so limited and attachment member(s) 96 may be disposed any location on disengaging outlet face plate 78 complementary to attachment member(s) 74 disposed on disengaging outlet face plate 54. In one aspect, attachment member(s) 96, raised edge 80, and/or recessed section(s) 82 constitute a disengaging electrical receptacle 300 complementary attachment mechanism (not separately labeled). In one embodiment, a disengaging electrical plug 300 comprises a cord (not shown), through which electrical wires connected to contact members 84A-C are in electronic communication with an electrical device (not shown) when a plug 300 is actively engaged with a disengaging electrical outlet 200.

In various embodiments (not shown), a disengaging electrical outlet 200 and/or a disengaging electrical receptacle plug 300 may comprise embodiments of coupling/communication components 10 and/or complementary coupling/communication components 11 described above with respect to electrical outlet 100 and/or plug 7, respectively, as well as additional safety and/or controlled access features as described above with regard to electrical outlet 100 and plug 7.

Operation

Generally, an embodiment of operating an embodiment of an electrical outlet 100 of the present invention comprises providing AC electrical power thereto. In one embodiment, an electrical device comprising an embodiment of a plug 7 is electrically connected to the electrical outlet 100 by engaging the plug 7 with a socket 4 thereof, as would be understood by one skilled in the art. Upon such engagement, the electrical outlet 100 coupling/communication component(s) 10 is/are positioned sufficiently proximate plug 7 complementary coupling/communication component(s) 11, such that the reed switch 34 connected to the complementary coupling/communication component(s) 11 is actuated, as described herein, thereby allowing AC power to flow through the socket 4 to the plug 7 to power the electrical device.

In other embodiments (not shown), an electrical system comprising one or more remotely actuatable reed switches 34 and/or other magnetic or non-magnetic switching mechanisms consistent with the teachings herein, can be employed to restrict access to electricity for rooms, homes, or entire buildings. In such an embodiment, only authorized users (i.e., only those persons having the necessary equipment and information to remotely actuate the switch(es)) 34 would be able to activate the electrical system for electrical current provision. In one aspect, a person utilizing, for example, a computer or smartphone application, could provide the necessary signal and/or information to the switch 34, which could include, but is not limited to, utilization of wave energy, (e.g., light waves), Bluetooth, WiFi, and/or RFID technologies.

Generally, an embodiment of operating an embodiment of a disengaging electrical outlet 200 of the present invention comprises providing AC electrical power thereto. In one embodiment, an electrical device comprising an embodiment of a disengaging electrical receptacle/plug 300 is electrically connected to the electrical outlet 200 by engaging the plug 300 with the electrical outlet 200, as would be understood by one skilled in the art. Upon such engagement, the disengaging electrical outlet 200 coupling/communication component(s) 75 is/are positioned sufficiently proximate plug 300 complementary coupling/communication component(s) 95, such that the reed switch (not shown) connected to the coupling/communication component(s) 75 is actuated, as described herein, thereby allowing AC power to flow through the disengaging electrical outlet 200 to the disengaging electrical plug 300 to power the electrical device. In one aspect, the engagement between a disengaging electrical outlet 200 and a disengaging electrical outlet 200, which is maintained by (1) the interaction of disengaging outlet coupling/communication component 74 with disengaging plug attachment member 96, (2) the interaction of disengaging outlet face plate 54 recessed edge 58 with disengaging plug face plate 78 raised edge 80, and/or (3) the interaction of disengaging outlet face plate 54 raised section 60 with disengaging plug face plate 78 recessed section 82. In one embodiment, the engagement maintaining interaction(s) is/are configured and adapted such that a desired level of "pulling" force on disengaging electrical outlet 200 and/or disengaging electrical plug 300, away from the other, disengages these devices. In such a manner, the functioning engagement of disengaging electrical outlet 200 with disengaging electrical plug 300 can be controlled so that an applied pulling force will disengage disengaging electrical outlet 200 from disengaging electrical plug 300 without damaging either component. In one aspect, a disengaging electrical plug 300 may be electrically connected to an electric motor vehicle (EV), aircraft, boat, etc., and a such that if the motor vehicle, for example, was inadvertently driven away without manually disengaging the disengaging electrical plug 300 from the disengage disengaging electrical outlet 200, the pulling force applied by the departing motor vehicle would effectuate the disengagement therebetween without damaging the vehicle, the disengaging electrical plug 300, or the disengaging electrical outlet 200 and/or a structure to which it is attached.

Method

An exemplary method of safe electricity provision utilizing an embodiment of an electrical outlet 100 of the present invention comprises:

An Outlet Provision Step, comprising providing an electrical outlet, such as an electrical outlet 100, which comprises one or more electrical sockets, such as a socket 4, one or more of which sockets comprise at least one coupling/communication component, such as a magnetic coupling/communication component 10, wherein the electrical outlet is electrically connected to an AC power source; and An Electrical Device Energization Step, comprising connecting an electrical device to the electrical outlet by engaging an electrical plug, such as a plug 7, which comprises at least one complementary magnetic coupling/communication component, such as a magnetic complementary coupling/communication component 11, and which is electrically connected to the electrical device, with one such electrical outlet socket, wherein the magnetic coupling/communication component and the complementary magnetic coupling/communication component are disposed sufficiently proximate such that a switch, such as a reed switch 34, of the electrical outlet is actuated, whereby AC power is provided by the socket to the plug and therefore to the electric device.

An exemplary method of safe electricity provision utilizing an embodiment of a disengaging electrical outlet 200 of the present invention comprises:

An Outlet Provision Step, comprising providing a disengaging electrical outlet, such as a disengaging electrical outlet 200, which comprises electrical contact members, such as electrical contact members 62A, 62B and 62C, one or more disengaging outlet attachment members, such as disengaging outlet attachment member 74, and at least one magnetic coupling/communication component, such as a magnetic coupling/communication component 75, wherein the electrical outlet is electrically connected to an AC power source; and An Electrical Device Energization Step, comprising connecting an electrical device to the electrical outlet by engaging a disengaging electrical receptacle/plug, such as a disengaging electrical receptacle/plug 300, which comprises electrical contact members, such as electrical contact members 84A, 84B and 84C, and at least one complementary magnetic coupling/communication component, such as a complementary magnetic coupling/communication component 95, and which is electrically connected to the electrical device, wherein the magnetic coupling/communication component and the complementary magnetic coupling/communication component are disposed sufficiently proximate such that switch, such as a reed switch 34, of the electrical outlet is actuated, whereby AC power is provided by the socket to the plug and therefore to the electric device, and wherein the electrical outlet and the receptacle/plug are readily disengaged if either is pulled away from the other.

The foregoing methods are merely exemplary, and additional embodiments of methods of safely providing electricity utilizing embodiments of electrical outlets of the present invention consistent with the teachings herein may be employed. In addition, in other embodiments, one or more of these steps may be performed concurrently, combined, repeated, re-ordered, or deleted, and/or additional steps may be added.

The foregoing description of the invention illustrates exemplary embodiments thereof. Various changes may be made in the details of the illustrated construction and process within the scope of the appended claims by one skilled in the art without departing from the teachings of the invention. Disclosure of existing patents, publications, and/or known art incorporated herein by reference is to the extent required to provide details and understanding of the disclosure herein set forth. The present invention should only be limited by the claims and their equivalents.

I claim:

1. An electrical outlet comprising:

an electrical coupling/communication component;

an electricity converter; and a relay;

wherein;

when hot AC electrical power is provided to said electricity converter and to said relay that is configured in an open configuration, a portion of said hot AC electrical power is converted by said electricity converter to DC electrical power, whereupon at least a portion of said DC electrical power is provided to said electrical coupling/communication component;

wherein;

when a complementary electrical coupling/communication component actuates said electrical coupling/communication component, at least a portion of said DC electrical power provided to said electrical coupling/communication component is provided to said relay, whereby said relay is reconfigured into a closed configuration, whereupon said hot AC electrical power provided to said relay is provided to an electrical contact of said electrical outlet.

2. The electrical outlet of claim 1, wherein said actuation of said electrical coupling/communication component by said complementary electrical coupling/communication component is accomplished by physical proximity or physical contact therebetween.

3. The electrical outlet of claim 1, wherein said electrical coupling/communication component comprises, or is in electrical communication with, an electrical switch.

4. The electrical outlet of claim 3, wherein said electrical switch comprises a reed switch.

5. The electrical outlet of claim 3, wherein said electrical switch comprises a light switch.

6. The electrical outlet of claim 3, wherein said electrical switch is actuated by physical force.

7. The electrical outlet of claim 3, wherein said electrical switch comprises an RFID.

8. The electrical outlet of claim 3, wherein:

said electrical coupling/communication component comprises a magnetic field sensor;

said complementary electrical coupling/communication component generates a magnetic field; and when said magnetic field is sensed by said magnetic field sensor at a preset level, said switch is actuated.

9. The electrical outlet of claim 1, wherein said electricity converter comprises a rectifier.

10. The electrical outlet of claim 1, wherein said complementary electrical coupling/communication component remotely actuates said electrical coupling/communication component.

11. The electrical outlet of claim 10, wherein said complementary electrical coupling/communication component remotely actuates said electrical coupling/communication component wirelessly.

12. The electrical outlet of claim 11, wherein said wireless remote actuation comprises an energy form selected from the group consisting of:

light waves, radio waves, and electromagnetic fields.

13. The electrical outlet of claim 11, wherein said wireless remote actuation comprises Bluetooth or WiFi communication.

14. The electrical outlet of claim 1 comprising one or more attachment members that assist in maintaining a disengaging electrical receptacle in contact with, or in proximity to, said electrical outlet.

15. The electrical outlet of claim 1 comprising a face plate having a substantially round geometry.

16. The electrical outlet of claim 15, wherein said face plate comprises a surface topography selected from the group consisting of:

substantially planar;

convex; and concave.

17. The electrical outlet of claim 1 comprising a hot electrical contact member and a neutral electrical contact member.

18. The electrical outlet of claim 17 comprising a grounding contact member.

19. The electrical outlet of claim 15, wherein said face plate comprises a surface feature selected from the group consisting of:

a recessed edge;

a raised section; and both a recessed edge and a raised section.

20. An electrical outlet comprising:

an electrical coupling/communication component; and a relay;

wherein;

when DC electrical power is provided to said electrical outlet, a portion of said DC electrical power is provided to said electrical coupling/communication component and a portion of said DC electrical power is provided to said relay that is configured in an open configuration;

wherein;

when a complementary electrical coupling/communication component actuates said electrical coupling/communication component, at least a portion of said DC electrical power provided to said electrical coupling/communication component is provided to said relay, whereby said relay is reconfigured into a closed configuration, whereupon at least a portion of said DC electrical power provided to said relay is provided to an electrical contact of said electrical outlet.

21. The electrical outlet of claim 20 comprising an electricity converter, wherein when hot AC electrical power, in lieu of DC electrical power, is provided to said electrical outlet, said hot AC electrical power is provided to said electricity converter and to said relay that is configured in an open configuration, a portion of said hot AC electrical power is converted by said electricity converter to DC electrical power, whereupon at least a portion of said DC electrical power is provided to said electrical coupling/communication component.

22. An electrical power provision system, comprising:

the electrical outlet of claim 1; and an electrical receptacle comprising said complementary electrical coupling/communication component.

23. An electrical power provision system, comprising:

the electrical outlet of claim 20; and an electrical receptacle comprising said complementary electrical coupling/communication component.

24. A method of supplying AC electrical power, comprising:

providing an electrical outlet comprising:

an electrical coupling/communication component;

an electricity converter; and a relay;

wherein;

when hot AC electrical power is provided to said electricity converter and to said relay that is configured in an open configuration, a portion of said hot AC electrical power is converted by said electricity converter to DC electrical power, whereupon at least a portion of said DC electrical power is provided to said electrical coupling/communication component;

wherein;

when a complementary electrical coupling/communication component actuates said electrical coupling/communication component, at least a portion of said DC electrical power provided to said electrical coupling/communication component is provided to said relay, whereby said relay is reconfigured into a closed configuration, whereupon said hot AC electrical power provided to said relay is provided to an electrical contact of said electrical outlet;

providing hot AC electrical power to said electrical outlet; and providing a complementary electrical coupling/communication component such that said electrical coupling/communication component is actuated, whereby hot AC electrical power is provided to an electrical contact of said electrical outlet.

25. A method of supplying DC electrical power, comprising:

providing an electrical outlet comprising:

an electrical coupling/communication component; and a relay;

wherein;

when DC electrical power is provided to electrical outlet, a portion of said DC electrical power is provided to said electrical coupling/communication component and a portion of said DC electrical power is provided to said relay that is configured in an open configuration;

wherein;

when a complementary electrical coupling/communication component actuates said electrical coupling/communication component, at least a portion of said DC electrical power provided to said electrical coupling/communication component is provided to said relay, whereby said relay is reconfigured into a closed configuration, whereupon at least a portion of said DC electrical power provided to said relay is provided to an electrical contact of said electrical outlet;

providing DC electrical power to said electrical outlet; and providing a complementary electrical coupling/communication component such that said electrical coupling/communication component is actuated, whereby DC electrical power is provided to an electrical contact of said electrical outlet.

26. A method of supplying either AC or DC electrical power, comprising:

providing an electrical outlet comprising:

an electrical coupling/communication component;

an electricity converter; and a relay;

wherein;

when DC electrical power is provided to said electrical outlet, a portion of said DC electrical power is provided to said electrical coupling/communication component and a portion of said DC electrical power is provided to said relay that is configured in an open configuration; and when hot AC electrical power is provided to said electrical outlet, said hot AC electrical power is provided to said electricity converter and to said relay that is configured in an open configuration, a portion of said hot AC electrical power is converted by said electricity converter to DC electrical power, whereupon at least a portion of said DC electrical power is provided to said electrical coupling/communication component;

wherein;

when a complementary electrical coupling/communication component actuates said electrical coupling/communication component, at least a portion of said DC electrical power provided to said electrical coupling/communication component, or at least a portion of said hot AC electrical power provided to said electrical coupling/communication component, is provided to said relay, whereby said relay is reconfigured into a closed configuration, whereupon at least a portion of said DC electrical power provided to said relay, or at least a portion of said hot AC electrical power provided to said relay, is provided to an electrical contact of said electrical outlet;

providing DC or hot AC electrical power to said electrical outlet; and providing a complementary electrical coupling/communication component such that said electrical coupling/communication component is actuated, whereby DC or hot AC electrical power is provided to an electrical contact of said electrical outlet.

* * * * *